United States Patent
Weber et al.

(10) Patent No.: US 6,890,458 B2
(45) Date of Patent: *May 10, 2005

(54) METHOD FOR FORMING ON-SITE A COATED OPTICAL ARTICLE

(75) Inventors: Steven Weber, Clearwater, FL (US); Yassin Y. Turshani, Largo, FL (US); Sidney S. White, North Seminole, FL (US); Hoa T. Dang, Tampa, FL (US); Sheila M. Tatman, North Seminole, FL (US); Karl A. Klemm, Largo, FL (US)

(73) Assignee: Essilor International Compagnie General d'Optique, Charenton Cedex (FR)

( * ) Notice: Subject to any disclaimer, the term of this patent is extended or adjusted under 35 U.S.C. 154(b) by 340 days.

This patent is subject to a terminal disclaimer.

(21) Appl. No.: 10/157,292

(22) Filed: May 29, 2002

(65) Prior Publication Data

US 2003/0122269 A1 Jul. 3, 2003

Related U.S. Application Data

(60) Provisional application No. 60/294,426, filed on May 29, 2001.

(51) Int. Cl.[7] .......................... B29D 11/04; B29D 11/00; G02B 1/00
(52) U.S. Cl. ...................... 264/1.24; 264/1.32; 264/1.7; 264/1.9
(58) Field of Search ................................ 264/1.1, 1.24, 264/1.32, 1.7, 1.9

(56) References Cited

U.S. PATENT DOCUMENTS

| | | | |
|---|---|---|---|
| 4,211,823 A | 7/1980 | Suzuki et al. | 428/412 |
| 4,237,183 A | 12/1980 | Fujiwara et al. | 428/336 |
| 5,015,523 A | 5/1991 | Kawashima et al. | 428/336 |
| 5,096,626 A | 3/1992 | Takamizawa et al. | 264/1.7 |
| 5,160,668 A | 11/1992 | Imus | 264/1.7 |
| 5,316,791 A | 5/1994 | Farber et al. | 427/464 |
| 5,547,618 A | 8/1996 | Magne | 264/1.36 |
| 5,562,839 A | 10/1996 | Pan | 216/26 |
| 5,662,839 A | 9/1997 | Magne | 264/1.38 |
| 5,733,483 A | 3/1998 | Soane et al. | 264/1.7 |
| 6,572,794 B1 * | 6/2003 | Berzon et al. | 264/1.38 |

FOREIGN PATENT DOCUMENTS

| | | |
|---|---|---|
| EP | 102847 | 3/1984 |
| EP | 0404111 | 12/1990 |
| EP | 1226011 | 1/2004 |
| JP | 59078301 | 5/1984 |
| JP | 63-87223 | 4/1988 |
| JP | 63-141001 | 6/1988 |
| WO | WO 94/10230 | 5/1994 |

OTHER PUBLICATIONS

Owens and Wendt, "Estimation of the surface force energy of polymers," *J. Appl. Polym. Sci.*, 1741–1747, 1969.

* cited by examiner

Primary Examiner—Stephen J. Lechert, Jr.
(74) Attorney, Agent, or Firm—Fulbright & Jaworski L.L.P.

(57) ABSTRACT

The invention relates to a method for forming from a mold optical articles. These methods are particularly useful in preparing ophthalmic articles such as ophthalmic lenses, having several optical coatings thereon. The invention also relates to ophthalmic articles produced by these methods.

22 Claims, 2 Drawing Sheets

METHOD FOR FORMING ON-SITE A COATED OPTICAL ARTICLE

CROSS-REFERENCE TO RELATED APPLICATIONS

This application claims priority to U.S. Provisional Application Ser. No. 60/294,426 filed May 29, 2001.

BACKGROUND OF THE INVENTION

1. Field of the Invention

The present invention relates to a method for forming from a mold optical articles, in particular ophthalmic articles such as ophthalmic lenses, having several optical coatings thereon.

2. Previous Art

It is a common practice in the art to coat at least one face of an ophthalmic lens with several coatings for imparting to the finished lens additional or improved optical or mechanical properties. Thus, it is usual practice to coat at least one face of an ophthalmic lens substrate typically made of an organic glass material with successively, starting from the face of the substrate, an impact-resistant coating (impact-resistant primer), a scratch-resistant coating (hard coat), an anti-reflecting coating and, optionally, a hydrophobic top coat.

Typically, optical articles made of organic glass materials are formed in a mold comprising two separate parts having optical surfaces which, when the two-parts are assembled, define a molding cavity. A liquid curable composition is then introduced in the molding cavity and cured to form the optical article. The optical article is thereafter recovered upon disassembling of the mold parts.

Examples of typical two-part molds and molding methods are disclosed in U.S. Pat. Nos. 5,547,618 and 5,662,839.

It is known in the art to also apply a scratch-resistant coating composition on the optical surfaces of the parts of a two-part mold, and if necessary precure it, assemble the mold parts, fill the molding cavity with an optical liquid curable material, cure the optical material and disassemble the mold parts to recover the molded optical article having a scratch-resistant coating deposited and adhered thereon.

Such a method is, for example, disclosed in document EP-102847.

U.S. Pat. No. 5,096,626 discloses a method for making an optical article having a scratch-resistant coating and/or an anti-reflecting coating thereon, which comprises:
forming an anti-reflecting coating and/or a scratch-resistant coating onto the optical surfaces of a two-part mold;
assembling the two-part mold;
pouring an optical liquid curable composition in the molding cavity;
curing the optical composition, and
disassembling the two-part mold for recovering the molded optical article having a scratch-resistant coating or a scratch-resistant coating and an anti-reflecting coating thereon;
wherein, either at least one release agent is incorporated into the scratch-resistant coating or a film of at least one release agent is formed on the optical surfaces of the mold parts, prior to the formation of the anti-reflecting coating and/or the scratch-resistant coating.

The preferred release agents useful in the method of U.S. Pat. No. 5,096,626 are fluorosilicones, fluoroalkylkoxysilanes and mixtures thereof.

U.S. Pat. No. 5,160,668 discloses a method for transferring an anti-reflecting coating onto a surface of an optical element which comprises:
forming on the optical surface of a part of a two-part mold a release layer of a water soluble inorganic salt;
forming on said release layer an anti-reflecting layer,
assembling the mold parts;
pouring a liquid optical curable composition in the molding cavity,
curing the optical composition,
disassembling the mold parts and dissolving the release layer in water to recover the coated optical element.

U.S. Pat. No. 5,733,483 discloses a method for forming on-site tinted and coated optical elements from a mold which comprises:
forming successively on an optical surface of at least one part of a two-part mold, a polymer release layer, an anti-reflecting coating layer, a coupling agent layer and a hard coat layer;
assembling the two-part mold;
pouring an optical liquid curable material in the molding cavity;
curing the optical material and the anti-reflecting, coupling agent and hard coat layers; and
disassembling the mold parts to recover the coated optical element.

The polymer release layer can be made of a water soluble polymer such as polyvinylic acid (PAA), polyethylene-oxide (PEO), poly(N-vinylpyrolidone) (PNVP), polyvinylalcohol (PVA) or polyacrylamid (PAM); a non-water soluble and UV curable polymer such as polybutadiene-diacrylate (PBD-SA), polyethyleneglycol-diacrylate (PEG-DA) or a highly crosslinked acrylate, and commercial mold release agents such as Dow-Corning 20 Release.

The coupling agent layer generally comprises a (meth)acryloxyalkyltrialkoxysilane. This coupling agent layer is used in order to better extract the anti-reflecting coating from the mold.

What is needed is a method which will provide on-site formation of optical articles having thereon an impact-resistant coating, a scratch-resistant coating, an anti-reflecting coating and, optionally, a hydrophobic top coat by replication of a mold, thereby sufficiently reducing required handling time and costs.

SUMMARY OF THE INVENTION

It is an object of this invention to provide a method for forming from a mold optical articles having an impact-resistant primer coating, a scratch-resistant coating, an anti-reflecting coating and, optionally, a hydrophobic top coat.

It is an additional object of this invention to provide a method for forming coated optical articles in which at least an anti-reflecting coating, a scratch-resistant coating and an impact-resistant primer coating are transferred in a single step from at least one mold optical surface onto a surface of an optical substrate.

It is a further object of this invention to provide a method which does not necessitate the use of a coupling agent layer between the anti-reflecting layer and the scratch-resistant layer.

In accordance with the above objects and those that will be mentioned and will become apparent below, the method for forming a coated optical article comprises:
providing a two-part mold having opposed optical surfaces defining therebetween a molding cavity;
forming successively, on at least one of the optical surfaces of the mold, an anti-reflecting coating, a scratch-resistant coating and an impact-resistant primer coating;

filling the molding cavity with an optical substrate liquid curable composition;

curing the liquid curable composition, and disassembling the two-part mold for recovering a coated optical article comprising an optical substrate having deposited and adhered on at least one of its faces, an impact-resistant primer coating, a scratch-resistant coating and an anti-reflecting coating.

In a preferred embodiment, the mold is made of a plastic material.

To further improve release of the coated optical article from the mold, a release agent can be incorporated in the plastic material of the mold, or the optical surfaces of the mold parts can be coated with a release agent layer.

In an additional preferred embodiment, to improve adhesion between the scratch-resistant coating and the impact-resistant primer coating or between the primer coating and the substrate, one or more coupling agents can be incorporated into the composition of the scratch-resistant coating and/or of the primer coating.

The preferred coupling agent is a pre-condensed solution of at least one epoxyalkoxysilane and at least one unsaturated alkoxysilane.

Preferably, the anti-reflective coating is a stack of alternated high and low refractive index inorganic material layers. To improve adhesion of such an anti-reflecting coating to the scratch-resistant coating a thin layer of $SiO_2$ may be interposed between the anti-reflecting coating and the scratch-resistant coating.

BRIEF DESCRIPTION OF THE DRAWING

For the further understanding of the objects and advantages of the present invention, reference should be made to the following detailed description, taken in conjunction with the accompanying drawings, in which like parts are given like reference numerals and wherein.

DETAILED DESCRIPTION OF THE INVENTION

Although in the following description, only one face of the optical article is being coated with the optical functional coatings according to the invention, it should be understood that both faces of the optical articles can be coated simultaneously using the method of the invention.

Figure 1A:
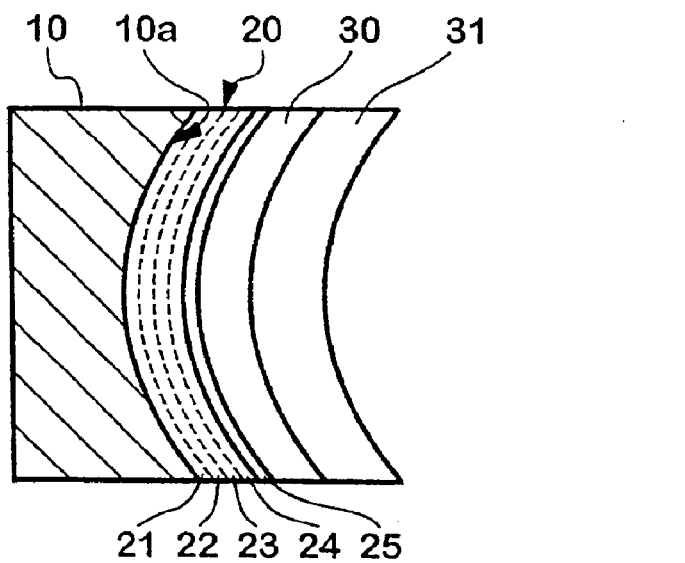
FIG. 1A to FIG. 1C schematically illustrate the main steps of an embodiment of the method of the invention.

With respect to FIG. 1A, there is shown schematically a front part 10 of a two-part mold, on the optical surface 10a of which has been successively formed an anti-reflecting coating 20, a scratch-resistant coating 30 and an impact-resistant primer coating 31.

The two-part mold used in the method of the invention comprises a front part 10 having an optical surface 10a and a rear part 11 (FIG. 1B) having an optical surface 11a.

Typically the two-parts 10, 11 of the mold are assembled through a gasket or an adhesive tape (not shown) so that the optical surfaces 10a, 11a of the mold parts define therebetween a molding cavity.

Typically the mold parts 10, 11 are made of mineral glass or a plastic material. In the method of the invention, the mold part are preferably made of a plastic material, in particular a plastic material that promotes easy release of the molded optical article.

Among the plastic materials that can be used for the two-part mold there can be cited: polycarbonates (PC), polyamides (PA), polyimides (PI), polysulfones (PS), copolymers of polyethyleneterephtalate and polycarbonate (PET-CP), crystal polyethyleneterephtalate (crystal PET), glass fiber reinforced polyethyleneterephtalate, and polyolefins such as polynorbornenes. The preferred plastic materials are polycarbonates and polynorbornenes.

A very good plastic material that can be used for the two part mold is a copolymer having the following units

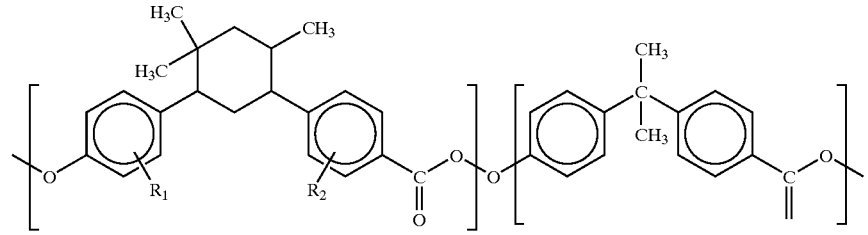

Such copolymer is available from Bayer under the commercial trade name APEC.

This copolymer has a high rigidity which can be an advantage for the use as a mold material.

Preferably, the thickness center for each mold part is at least 4 mm.

To enhance the release effect of the molds, in particular with regard to the anti-reflecting coating, one or more release agents can be incorporated in the polymer material of the mold. Examples of such release agents are trimethylchlorosilane, chloromethyltrimethylsilane, chloropropyltrimethylsilane, chloromethyldodecyl dimethylsilane, chlorine terminated polydimethyl siloxane, (3,3-dimethylbutyl) dimethylchlorosilane, hexamethyldisilazane, octamethyltetrasilazane, aminopropyldimethyl terminated polydimethylsiloxane, 3-trimethoxysilyl propyloctadecyldimethylammonium chloride, tetradecyldimethyl (3-trimethoxysilylpropyl) ammonium chloride, trimethylethoxysilane and octadecyltrimethoxysilane.

If necessary the optical surfaces 10a, 11a of the parts of the plastic mold may be previously coated with a protective and/or release coating which either protects the optical surfaces from defects such as scratches that may be created during handling, and/or enhance the release effect. This protective and/or release coating may also even the optical surface Examples of such coatings are:

A UV-curable acrylic layer optionally containing at least one of the above cited release agent or an amine containing polysiloxane layer optionally containing at least one of the above release agent;

A fluorocarbon polymer layer, such as polytetrafluoroethylene (PTFE) polymers, for example Teflon® AF, Teflon® PTFE FEP and Teflon® PTFE PFA;

A buffer layer which may delaminate from the mold part optical surface and from which the anti-reflecting coating or the top coat can release, such as a vacuum-deposited magnesium fluoride ($MgF_2$) layer or a siloxane base coating normally used to input scratch resistance to lenses. Both of these layers release readily from the optical surface of the mold, in particular of a polycarbonate mold. After demolding of the optical article, these layers are eliminated.

The protective and/or release coatings can be deposited by dip coating or spin coating, and depending upon their technical natures they may be UV and/or thermally cured or simply dried. Those protective and/or release coatings have typically a thickness of 2 nm to 10 microns.

The mold parts, usually made of plastic material, are UV transparent and allow UV and/or thermal curing of the different layers and in particular of the optical substrate composition. Preferably, the polymer material of the mold parts are free of UV absorber.

As shown in FIG. 1A, there is first deposited on the optical surface 10a of the first part 10 of, for example, a polycarbonate mold, an anti-reflecting coating 20.

Anti-reflecting coatings and their methods of making are well known in the art. The anti-reflecting can be any layer or stack of layers which improves the anti-reflective properties of the finished optical article.

The anti-reflecting coating may preferably consist of a mono- or multilayer film of dielectric materials such as SiO, $SiO_2$ $Si_3N_4$, $TiO_2$, $ZrO_2$, $Al_2O_3$, $MgF_2$ or $Ta_2O_5$, or mixtures thereof.

The anti-reflecting coating can be applied in particular by vacuum deposition according to one of the following techniques:
1)—by evaporation, optionally ion beam-assisted;
2)—by spraying using an ion beam,
3)—by cathode sputtering; or
4)—by plasma-assisted vapor-phase chemical deposition.

In case where the film includes a single layer, its optical thickness must be equal to $\lambda/4$ where $\lambda$ is wavelength of 450 to 650 nm.

Preferably, the anti-reflecting coating is a multilayer film comprising three or more dielectric material layers of alternatively high and low refractive indexes.

Of course, the dielectric layers of the multilayer anti-reflecting coating are deposited on the optical surface of the mold part or the hydrophobic top coat in the reverse order they should be present on the finished optical article.

In the embodiment shown in FIG. 1A, the anti-reflecting coating 20 comprises a stack of four layers formed by vacuum deposition, for example a first $SiO_2$ layer 21 having an optical thickness of about 100 to 160 nm, a second $ZrO_2$ layer 22 having an optical thickness of about 120 to 190 nm, a third $SiO_2$ layer 23 having an optical thickness of about 20 to 40 nm and a fourth $ZrO_2$ layer 24 having an optical thickness of about 35 to 75 nm.

Preferably, after deposition of the four-layer anti-reflecting stack, a thin layer of $SiO_2$ 25 of 1 to 50 nm thick (physical thickness) is deposited. This layer 25 promotes the adhesion between the anti-reflecting stack and the scratch-resistant coating 30 to be subsequently deposited, and is not optically active.

The next layer to be deposited is the scratch-resistant coating 30. Any known optical scratch-resistant coating composition can be used to form the scratch-resistant coating 30. Thus, the scratch-resistant coating composition can be a UV and/or a thermal curable composition.

By definition, a scratch-resistant coating is a coating which improves the abrasion resistance of the finished optical article as compared to a same optical article but without the scratch-resistant coating.

Preferred scratch-resistant coatings are those made by curing a precursor composition including epoxyalkoxysilanes or a hydrolyzate thereof, silica and a curing catalyst. Examples of such compositions are disclosed in U.S. Pat. No. 4,211,823, WO 94/10230, U.S. Pat. No. 5,015,523.

The most preferred scratch-resistant coating compositions are those comprising as the main constituents an epoxyalkoxysilane such as, for example, γ-glycidoxypropyltrimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions.

In order to improve the adhesion of the scratch-resistant coating 30 to the impact-resistant primer coating 31 to be subsequently deposited, an effective amount of at least one coupling agent can be added to the scratch-resistant coating composition.

The preferred coupling agent is a pre-condensed solution of an epoxyalkoxysilane and an unsaturated alkoxysilane, preferably comprising a terminal ethylenic double bond.

Examples of epoxyalkoxysilanes are γ-glycidoxypropyltermethoxysilane, γ-glycidoxypropylpentamethyldisiloxane, γ-glycidoxy-propylmethyldiisopropenoxysilane, (γ-glycidoxypropyl)methyldiethoxy-silane, γ-glycidoxypropyldimethylethoxysilane, γ-glycidoxypropyl-diisopropylethoxysilane and (γ-glycidoxypropyl)bis(trimethylsiloxy)methylsilane.

The preferred epoxyalkoxysilane is γ-glycidoxypropyltrimethoxysilane.

The unsaturated alkoxysilane can be a vinylsilane, an allylsilane, an acrylic silane or a methacrylic silane.

Examples of vinylsilanes are vinyltris(2-methoxyethoxy) silane, vinyltrisisobutoxysilane, vinyltri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxy-silane, vinylbis(trimethylsiloxy) silane and vinyldimethoxyethoxysilane.

Examples of allylsilanes are allyltrimethoxysilane, alkyltriethoxysilane and allyltris(trimethylsiloxy)silane.

Examples of acrylic silanes are 3-acryloxypropyltris (trimethylsiloxy)silane, 3-acryloxypropyltrimethoxysilane, acryloxypropylmethyl-dimethoxysilane, 3-acryloxypropylmethylbis(trimethylsiloxy)silane, 3-acryloxypropyldimethylmethoxysilane, n-(3-acryloxy-2-hydroxypropyl)-3-aminopropyltriethoxysilane.

Examples of methacrylic silanes are 3-methacryloxypropyltris (vinyldimethoxylsiloxy)silane, 3-methacryloxypropyltris(trimethylsiloxy) silane, 3-methacryloxypropyltris(methoxyethoxy)silane, 3-methacrylo-xypropyltrimethoxysilane, 3-methacryloxypropylpentamethyl disiloxane, 3-methacryloxypropylmethyldimethoxysilane, 3-methacryloxypropylmethyl-diethoxysilane, 3-methacryloxypropyldimethyl methoxysilane, 3-methacryloxypropyldimethylethoxysilane, 3-methacryloxypropenyltrime-thoxysilane and 3-methacryloxypropylbis(trimethylsiloxy)methylsilane.

The preferred silane is acryloxypropyltrimethoxysilane.

Preferably, the amounts of epoxyalkoxysilane(s) and unsaturated alkoxysilane(s) used for the coupling agent preparation are such that the weight ratio $$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight.

The coupling agent preferably comprises less than 40% by weight of liquid water and/or organic solvent, more preferably less than 35% by weight.

The expression "weight of solid material from epoxyalkoxy silanes and unsatured alkoxysilanes" means the theoritical dry extract from those silanes which is the calculated weight of unit $Q_k$ Si $O_{(4-k)/2}$ where Q is the organic group that bears the epoxy or unsaturated group and $Q_k$ Si $O_{(4-k)/2}$ comes from $Q_k$ Si $R'O_{(4-k)}$ where Si R' reacts to form Si OH on hydrolysis.

k is an integer from 1 to 3 and is preferably equal to 1.

R' is preferably an alkoxy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprises:

1) mixing the alkoxysilanes
2) hydrolysing the alkoxysilanes, preferably by addition of an acid, such a hydrochloric acid
3) stirring the mixture
4) optionally adding an organic solvent
5) adding one or several catalyst(s) such as aluminum acetylocetonate
6) stirring (typical duration: overnight).

Typically the amount of coupling agent introduced in the scratch-resistant coating composition represents 0.1 to 15% by weight of the total composition weight, preferably 1 to 10% by weight.

The scratch-resistant coating composition can be applied on the anti-reflecting using any classical method such as spin, dip or flow coating.

The scratch-resistant coating composition can be simply dried or optionally precured before application of the subsequent impact-resistant primer coating 31. Depending upon the nature of the scratch-resistant coating composition thermal curing, UV-curing or a combination of both can be used.

Thickness of the scratch-resistant coating 30, after curing, usually ranges from 1 to 15 µm, preferably from 2 to 6 µm.

Before applying the impact resistant primer on the scratch resistant coating, it is possible to subject the surface of the scratch resistant coating to a corona treatment or a vacuum plasma treatment, in order to increase adhesion.

The impact-resistant primer coating 31 can be any coating typically used for improving impact resistance of a finished optical article. Also, this coating generally enhances adhesion of the scratch-resistant coating 30 on the substrate of the finished optical article.

By definition, an impact-resistant primer coating is a coating which improves the impact resistance of the finished optical article as compared with the same optical article but without the impact-resistant primer coating.

Typical impact-resistance primer coatings are (meth)acrylic based coatings and polyurethane based coatings.

(Meth)acrylic based impact-resistant coatings are, among others, disclosed in U.S. Pat. No. 5,015,523 whereas thermoplastic and cross linked based polyurethane resin coatings are disclosed inter alia, in Japanese Patents 63-141001 and 63-87223, EP-0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethyleneglycol(meth)acrylate based compositions such as, for example, tetraethyleneglycoldiacrylate, polyethyleneglycol (200) diacrylate, polyethyleneglycol (400) diacrylate, polyethyleneglycol (600) di(meth)acrylate, as well as urethane (meth)acrylates and mixtures thereof.

Preferably the impact-resistant primer coating has a glass transition temperature (Tg) of less than 30° C.

Among the preferred impact-resistant primer coating compositions, there may be cited the acrylic latex commercialized under the name Acrylic latex A-639 commercialized by Zeneca and polyurethane latex commercialized under the names W-240 and W-234 by Baxenden.

In a preferred embodiment, the impact-resistant primer coating may also includes an effective amount of a coupling agent in order to promote adhesion of the primer coating to the optical substrate and/or to the scratch-resistant coating.

The same coupling agents, in the same amounts, as for the scratch-resistant coating compositions can be used with the impact-resistant coating compositions.

The impact-resistant primer coating composition can be applied on the scratch-resistant coating 30 using any classical method such as spin, dip, or flow coating.

The impact-resistant primer coating composition can be simply dried or optionally precured before molding of the optical substrate. Depending upon the nature of the impact-resistant primer coating composition, thermal curing, UV-curing or a combination of both can be used.

Thickness of the impact-resistant primer coating 31, after curing, typically ranges from 0.05 to 20 µm, preferably 0.5 to 10 µm and more particularly from 0.6 to 6 µm.

Figure 1B:
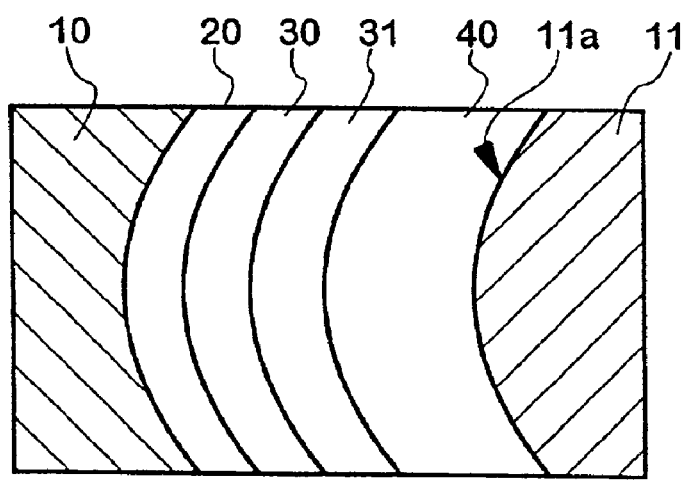

The next step of the method is, as shown in FIG. 1B, assembling the front part 10 coated with the anti-reflecting, scratch-resistant and impact-resistant primer coatings 20, 30, 31 with the rear part 11 of the two-part mold as described, for example, in U.S. Pat. Nos. 5,547,618 and 5,562,839.

The molding cavity is then filled with a liquid curable optical composition which is cured to form the optical substrate 40.

The optical substrate can be made from any typical liquid, curable composition used in the optical field.

Examples of such optical substrates are substrates resulting from the polymerization of:

diethylene glycol bis (allylcarbonate) based compositions, (meth)acrylic monomer based compositions, such as compositions comprising (meth)acrylic monomers derived from bisphenol-A;

thio(meth)acrylic monomer based compositions;

polythiourethane precursor monomer based compositions; and epoxy and/or episulfide monomer based compositions.

Depending upon the nature of the curable optical material, the optical material can be thermally cured, UV-cured or cured with a combination of both, or cured at ambient temperature.

Figure 1C:
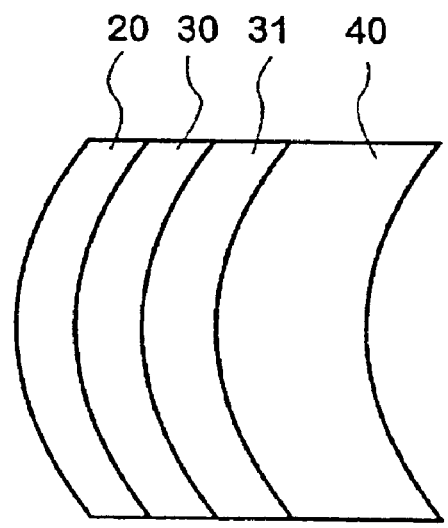

As shown in FIG. 1C, once the optical substrate 40 has been cured, and optionally concurrently the scratch-resistant coating 30 and the impact-resistant primer coating 31 if not previously cured, the mold part 10, 11 are disassembled to recover the optical substrate 40 having transferred on one face, the impact-resistant primer coating 31, the scratch-resistant coating 30 and the anti-reflecting coating 20.

Figure 2A:
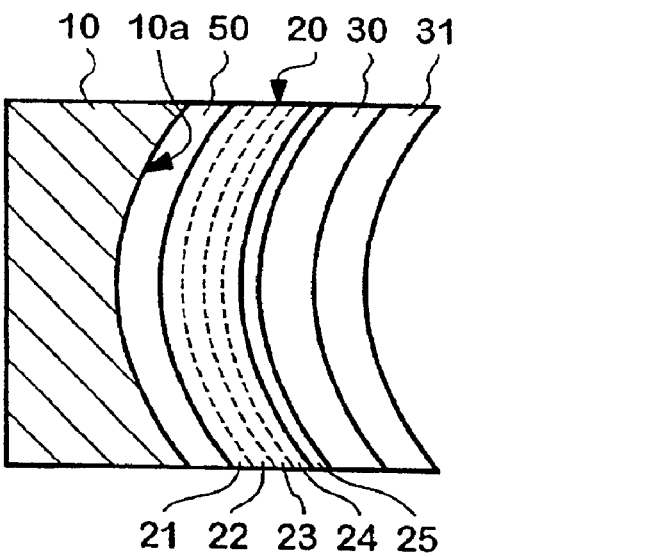
FIG. 2A to FIG. 2C schematically illustrate the main steps of another embodiment of the method of the invention.
Figure 2B:
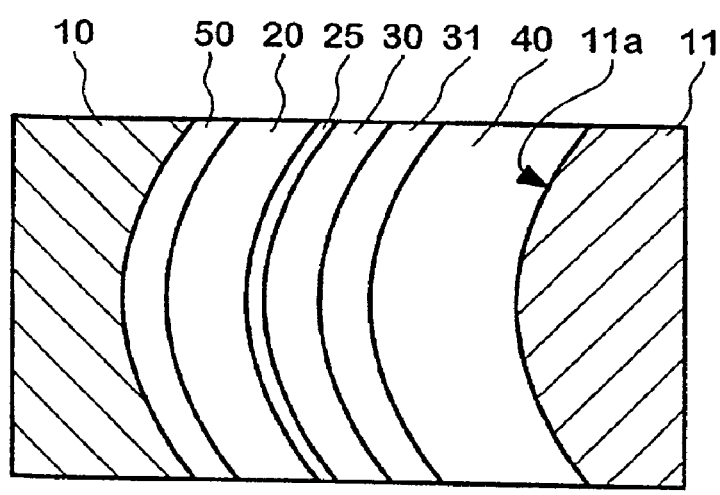
Figure 2C:
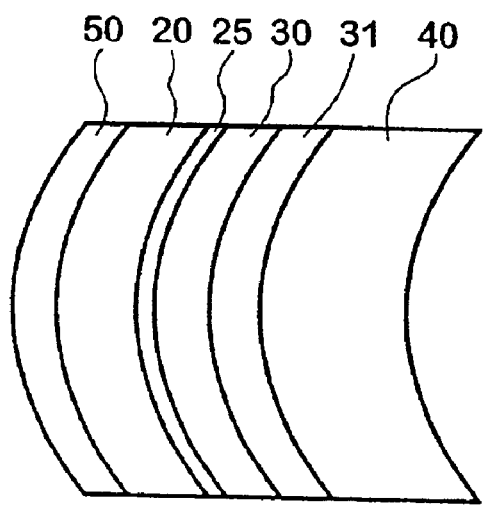

There is shown in FIGS. 2A to 2C another embodiment of the method of the invention.

The essential difference between the method described in connection with FIGS. 1A to 1C and the method illustrated by FIGS. 2A to 2C is that an additional hydrophobic top coat 50 is deposited onto the optical surface 10a of the front part 10 of the mold prior to the deposition of the anti-reflecting coating 20.

The hydrophobic top coat 50, which in the finished optical article constitutes the outermost coating on the optical substrate, is intended for improving dirty mark resistance of the finished optical article and in particular of the anti-reflecting coating.

As known in the art, a hydrophobic top coat is a layer wherein the stationary contact angle to deionized water is at least 60°, preferably at least 75° and more preferably at least 90°.

The stationary contact angle is determined according to the liquid drop method in which a water drop having a diameter smaller than 2 mm is formed on the optical article and the contact angle is measured.

The hydrophobic top coats preferably used in this invention are those which have a surface energy of less than 14 m Joules/m².

The invention has a particular interest when using hydrophobic top coats having a surface energy of less than 13 m Joules/m² and even better less than 12 m Joules/m².

The surface energy values referred just above are calculated according to Owens Wendt method described in the following document: "Estimation of the surface force energy of polymers" Owens D. K.—Wendt R. G. (1969) J. Appl. Polym. Sci., 1741–1747.

Such hydrophobic top coats are well known in the art and are usually made of fluorosilicones or fluorosilazanes i.e. silicones or silazanes bearing fluor-containing groups. Example of a preferred hydrophobic top coat material is the product commercialized by Shin Etsu under the name KP 801M.

The top coat 50 may be deposited onto the optical surface 10a of mold part 10 using any typical deposition process, but preferably using thermal evaporation technique.

Although the deposition of the top coat is preferably made by transfer from the mold, the top coat can be also applied by any classical means (for example dip coating) on an antireflective lens previously obtained by the transfer method (without any top coat applied on the mold).

Thickness of the hydrophobic top coat usually ranges from 1 to 30 nm, preferably 1 to 15 nm.

The remaining steps of this second embodiment of the method of the invention are identical to those described in relation with FIGS. 1A to 1C.

The following examples illustrate the present invention. In the examples, unless otherwise stated, all parts and percentages are by weight.

1. Two-Part Mold

In all the examples the mold used was made of polycarbonate (General Electric Company).

2. Scratch-resistant coating compositions (hard coating composition) The following thermal and/or UV curable hard coating compositions were prepared by mixing the components as indicated hereinunder.

| Component | Parts by weight |
|---|---|
| Hard coating composition n° 1: thermally curable | |
| Glymo | 21.42 |
| 0.1N HCI | 4.89 |
| Colloidal Silica 1034A (35% by weight of solid) | 30.50 |
| Methanol | 29.90 |
| Diacetone alcohol | 3.24 |
| Aluminum acetylacetonate | 0.45 |
| Coupling agent | 9.00 |
| Surfactant (1/10 dilution) | 0.60 |
| Hard coating composition n° 2: thermally curable | |
| Glymo | 18.6 |
| 0.1N HCI | 6.62 |
| Dimethyldiethoxysilane (DMDES) | 9.73 |
| Colloidal Silica/MeOH[(1)] | 60.1 |
| Aluminum acetylacetonate | 1.2 |
| Methyl Ethyl Ketone (MEK) | 3.65 |
| Coupling agent | 5.00 |
| Surfactant FC 430[(2)] | 0.05 |
| Hard coating composition n° 3: thermally curable | |
| Glymo | 18.6 |
| 0.1N HCI | 6.62 |
| Dimethyldiethoxysilane | 9.73 |
| Colloidal Silica/MeOH[(1)] | 60.1 |
| Aluminum acetylacetonate | 1.2 |
| Methyl Ethyl Ketone (MEK) | 3.65 |
| Surfactant FC430[(2)] | 0.05 |
| Hard coating composition n° 4: (UV curable) | |
| Glymo | 23.75 |
| n-propanol | 14.25 |
| Colloidal Silica MeOH[(1)] | 47.51 |
| Tyzor DC (1% dilution)[(3)] | 14.25 |
| UVI-6974[(4)] | 0.2735 |
| Coupling agent: precondensed solution of: | |
| Glymo | 10.0 |
| Acryloxypropyltrimethoxysilane | 10.0 |
| 0.1N HCI | 0.5 |
| Aluminum acetylacetonate | 0.2 |
| Diacetone alcohol | 1.0 |

[(1)]Sun Colloid MA-ST from NISSAN Company (30% by weight of solid $SiO_2$)
[(2)]FC430: surfactant commercialized by 3M Company
[(3)]Tyzor:

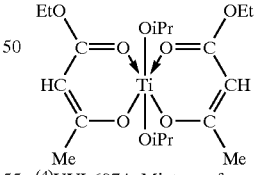

[(4)]UVI-6974: Mixture of:

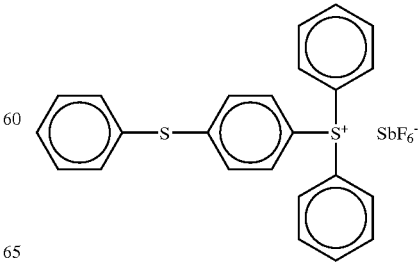

and

-continued

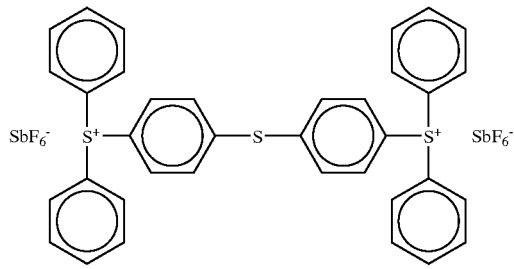

3. Impact-Resistant Primer Coating Compositions (Primer Coating Compositions)

Several primer coating compositions were made by mixing the various components as indicated below:

| Component | Parts by weight |
|---|---|
| Impact Primer Coating Composition n° 1a (UV curable Acrylic) | |
| Tetraethylene glycol diacrylate (SR-268) | 12.42 |
| Aliphatic urethane triacrylate (EB-265) | 16.87 |
| n-propanol | 20.27 |
| Dowanol PM[5] | 20.27 |
| Dowanol PnP[6] | 20.27 |
| Coupling agent | 9.00 |
| ITX[7] | 0.063 |
| Irgacure 500[8] | 0.60 |
| Surfactant FC-430 (50% dilution) | 0.21 |
| Impact Primer Coating Composition n° 1b (UV curable Acrylic) | |
| Polyethylene (400) glycol diacrylate (SR-344) | 12.42 |
| Aliphatic urethane triacrylate (EB-265) | 16.87 |
| n-propanol | 20.27 |
| Dowanol PM | 20.27 |
| Dowanol PnP | 20.27 |
| Coupling agent | 9.00 |
| ITX | 0.063 |
| Irgacure 500 | 0.60 |
| Surfactant FC-430 (50% dilution) | 0.21 |
| Impact Primer Coating Composition n° 2 (thermal curable polyurethane latex W-234) | |
| Polyurethane Latex W-234[9] | 35.0 |
| Deionized Water | 50.0 |
| 2-Butoxy Ethanol | 15.0 |
| Coupling agent or | 5.0 |
| Polyurethane Latex W 234 | 40.0 |
| Deionized Water | 40.0 |
| Dowanol PnP | 20.0 |
| Coupling agent | 5.0 |
| Surfactant L77[10] | 0.5 |
| Impact Primer Coating Composition n° 3 (Thermal curable, Acrylic latex A-639) | |
| Acrylic latex A-639[11] | 40.0 |
| Deionized water | 40.0 |
| 2-Butoxy Ethanol | 20.0 |
| Impact Primer Coating Composition n° 4 (UV curable Hybrid) | |
| UVR6110[12] | 13.00 |
| HDODA[13] | 10.89 |
| Pentaerithritol pentaacrylate | 30.36 |
| GE 21[14] | 30.29 |
| Diethylene glycol diacrylate | 7.01 |
| Isobornyl acrylate | 2.29 |
| Surfactant | 0.09 |
| Mixed triarylsulfonium hexafluoroantimonate salts | 0.30 |
| Impact Primer Coating Composition n° 5 (UV curable Hybrid) | |
| UVR6110 | 13.00 |
| HDODA | 10.89 |
| Polyethylene glycol (400) diacrylate | 30.36 |
| GE 21 | 30.29 |
| Diethylene glycol diacrylate | 7.01 |
| Isobornyl acrylate | 2.29 |
| Surfactant | 0.09 |
| Mixed triarylsulfonium hexafluoroantimonate salts | 0.30 |

[5]Dowanol PM: 1-methoxy-2-propanol and 2-methoxy-1-propanol solvent commercialized by DOW CHEMICAL.
[6]Dowanol PnP: solvent commercialized by DOW CHEMICAL which is a mixture of:
1-propoxy-2-propanol, 2-propoxy-1-propanol, Propyleneglycol, Diethyleneglycol, Dipropylglycolmonopropylether
[7]ITX: Isopropylthioxanthone
[8]Irgacure 500: 1/1 mixture of benzophenone + 1-hydroxycyclohexylphenyl
[9]Polyurethane latex commercialized by Baxenden
[10]L77 surfactant commercialized by OSI Specialities
[11]Acrylic Latex-A-639 commercialized by Zeneca
[12]UVR6110 3,4-epoxycyclohexylmethyl-3,4-epoxycyclohexylcarbonate + monoepoxide of 3-cyclohexenylmethyl-3-cyclocarboxylate
[13]HDODA 1,6-hexanediol diacrylate
[14]GE21 1,4-butanediol diglycidylether

4. Optical Substrate Compositions

| Component | Parts by weight |
|---|---|
| Optical substrate composition n° 1 (UV/Thermally curable) | |
| The following mixture was prepared at 40° C. in the dark. | |
| Tetraethoxy bisphenol A dimethacrylate | 980 |
| Methyl butene-1 ol | 20 |
| Irgacure 1850[15] | 1.75 |
| Optical substrate composition n° 2 (UV/Thermally curable) | |
| Polypropyleneglycol (400) dimethacrylate | 51 |
| Urethane methacrylate (Plex ® 66610) | 34 |
| Isobornyle methacrylate | 15 |
| Irgacure 1850 | 0.1 |
| Optical substrate composition n° 3 (UV/Thermally curable) | |
| Thiomethacrylate[16] | 70 |

-continued

| | |
|---|---|
| Dicyclopentadiene dimethacrylate | 10 |
| FA321M[17] | 20 |
| Methylbutene-1-ol | 0.3 |
| UV 5411[18] | 0.1 |
| Irgacure 819[19] | 0.1 |

[15]Irgacure 1850: mixture (50/50 by weight) of:

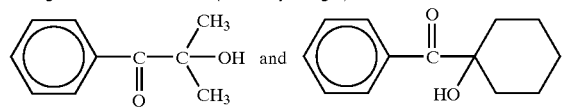

[16]Thiomethacrylate: Plex (6856) sold by RÖHM.
[17]FA 321M

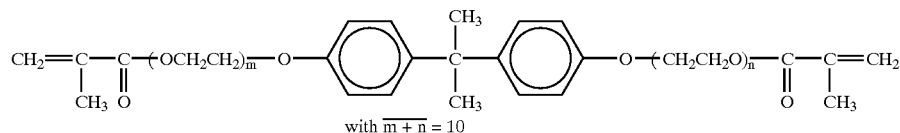

with $\overline{m+n} = 10$

[18]UV 5411: 2-(2-hydroxy-5-t-ocylphenyl)benzotriazole.
[19]Irgacure 819: photoinitiator of formula:

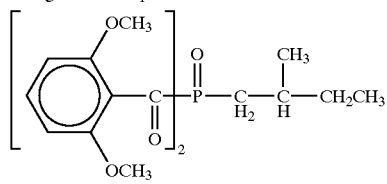

5. Preparation of the Mold

Unless otherwise stated, the polycarbonate molds used in the examples were prepared as follows:

a) The injection-molded polycarbonate mold is de-gated and then edged. The edging process may create scratches on the surface of the mold, so tape covering of at least the central portion of the mold surface is used during edging.
b) After edging, the mold is wipped, cleaned in ultrasonic system, and then heated in a clean oven for half an hour at 100° C.

6. Deposition of Hydrophobic Top Coat and Anti-Reflecting Coating

Unless otherwise stated, hydrophobic top coat and anti-reflecting coating were deposited on the optical surface of the front part of the mold as follows:

The hydrophobic top coat and anti-reflecting treatments are accomplished in a standard box coater using well known vacuum evaporation practices.

a—The mold is loaded into the standard box coater such as a Balzers BAK760 and the chamber is pumped to a high vacuum level.
b—Hydrophobic top coat, a fluorosilazane (Shin Etsu KP801M), is deposited onto the optical surface of the first part of the mold using a thermal evaporation technique, to a thickness in the range of 2–15 nm.
c—The dielectric multilayer anti-reflecting (AR) coating, consisting of a stack of high- and low-index materials is then deposited, in reverse of the normal order. Details of this deposition are as such:

The first layer is a layer of of $SiO_2$ having a physical thickness of 80–110 nm (optical thickness about 100–160 nm).

The second layer is a layer of $ZrO_2$ having an optical thickness of about 160 nm, the third layer is a $SiO_2$ layer having an optical thickness of about 30 nm and the fourth layer is a $ZrO_2$ layer having an optical thickness of about 55 nm (optical thickness are given at a warelength of 550 nm).

d—At the completion of the deposition of the four-layer anti-reflecting stack, a thin layer of $SiO_2$, having a physical thickness of 1–50 nm, is deposited. This layer is to promote adhesion between the oxide antireflecting stack and the subsequent hard-coating which will be deposited on the coated mold at a later time.

EXAMPLE 1

The front part of a polycarbonate two-part mold already coated with a hydrophobic top coat and an AR coating was coated with Hard Coating Composition n° 1. Hard coating application speed was set at 400 rpm for 8 seconds and spin off speed at 800 rpm for 10 seconds. Hard Coating Composition is cured by IR for 30 seconds with 725F setting, using Lesco IR curing unit. The coated mold was allowed to cool to room temperature and Impact Primer Coating Composition n° 1a is applied at the same speed and timing as mentioned above. Impact Primer Coating composition is cured by UV light, using Fusion system H bulb with belt speed of (5 feet per minute) 1.526 m/minute.

Final coating cure was achieved using Lesco IR curing unit set at 725F for 30 seconds.

The coated plastic mold was assembled, filled with optical substrate composition n° 1 and polymerized within 20 minutes. Upon disassembly of the plastic mold, all of the coatings were transferred to the finished lens.

EXAMPLE 2

The first part of a polycarbonate two-part mold already coated with a hydrophobic top coat and an AR coating was coated with Hard Coating Composition n° 1. Hard coating application speed was set at 400 rpm for 8 seconds and spin off speed at 800 rpm for 10 seconds. Hard Coating Composition cured by IR for 30 seconds with 725F setting, using Lesco IR curing unit. The coated mold was allowed to cool to room temperature and Impact Primer Coating Composition n° 1b was applied at the same speed and timing as mentioned above. Impact Primer Coating Composition was cured by UV light, using Fusion system H bulb with belt speed of (5 feet per minute) 1.524 m/minute.

Final coating cure was achieved using Lesco IR curing set at 725F for 30 seconds.

The coated plastic mold was assembled, filled with optical substrate Composition n° 1 and polymerized within 20 minutes. Upon disassembly of the plastic mold, all of the coatings were transferred to the finished lens.

EXAMPLE 3

The front part of a polycarbonate two-part mold already coated with a hydrophobic top coat and an AR coating was coated with Hard Coating Composition n° 2. Hard coating application speed was 500 rpm for 8 seconds and spin off at 1200 rpm for 10 seconds. Hard Coating Composition precured in a thermal heated oven for 10 minutes at 80° C. The coated mold was allowed to cool to room temperature. Impact Primer Coating Composition n° 2 was applied at the application speed 400 rpm for 8 seconds and spin off 1000 rpm for 10 seconds. Impact Primer Coating was precured at the same temperature and timing as the Hard Coating.

Final coating curing was done in a thermal heated oven for 1 hour at 90° C.

The coated plastic mold was assembled, filled with optical substrate composition n° 1 and polymerized within 20 minutes. Upon disassembly of the molds, all of the coatings transferred to the finished lens.

EXAMPLE 4

The front part of a polycarbonate two-part mold already coated with a hydrophobic top coat and an AR coating was coated with Hard Composition n° 3, this hard coating did not contain a coupling agent. Hard coating application speed was 500 rpm. for 8 seconds and spin off. at 1200 rpm. for 10 seconds. Hard Coating was precured in a thermal heated oven for 10 minutes at 80° C. The coated mold was allowed to cool to room temperature. Impact Primer Coating Composition n° 2 was applied at the application speed 400 rpm for 8 seconds and spin off 1000 rpm for 10 seconds. Impact Primer Coating was precured at the same temperature and timing as the Hard Coating.

Final coating curing was done in a thermal heated oven for 1 hour at 90° C.

The coated plastic mold was assembled, filled with optical substrate composition n° 1 and polymerized within 20 minutes. Upon disassembly of the mold, all of the coatings transferred to the finished lens.

EXAMPLE 5

The front part of a polycarbonate two-part mold already coated with a hydrophobic coat and an AR coating was coated with Hard Coating Composition n° 2. Hard coating application speed was 500 rpm for 8 seconds and spin off at 1200 rpm. for 10 seconds. Hard Coating was precured in a thermal heated oven for 10 min at 80° C. Coated mold was cooled down to room temperature. Impact Primer Coating Composition 3 was applied at the application speed 600 rpm for 8 seconds and spin off 1500 rpm for 10 seconds. Impact Primer Coating was precured at the same temperature and timing as Hard Coating Composition n° 2.

Final coating curing was achieved in a thermal heated oven for 2 hours at 90° C.

The coated molds were assembled, filled with optical substrate composition n° 1 and polymerized within 20 minutes. Upon disassembly of the plastic mold, all of the coatings transferred to the finished lens.

EXAMPLE 6

The front part of a polycarbonate two-part mold already coated with a hydrophobic top coat and an AR coating was coated with Hard Coating Composition n° 4. Hard coating application speed was set at 600 rpm for 8 seconds and spin off speed at 1200 rpm for 10 seconds. Hard Coating was UV cured by Fusion system H bull at (5 feet per minute) 1.524 m/minute and followed by 30 seconds IR cure at 725F for 30 seconds, using Lesco IR curing unit. Coated mold was allowed to cool to room temperature and impact Primer Coating Composition n° 4 was applied at the same speed and timing as mentioned above. Impact Primer Coating was cured by UV light, using Fusion system H bulb with belt speed of (5 feet per minute) 1.524 m/minute.

Final coating curing was achieved using Lesco IR curing unit set at 725F for 30 seconds.

The coated plastic mold was assembled, filled with optical composition n° 1 and polymerized within 20 minutes. Upon disassembly of the mold, all of the coatings transferred to the finished lens.

EXAMPLE 7

The front part of a polycarbonate two-part mold already coated with a hydrophobic top coat and an AR coating was coated with Hard Coating Composition n° 4. Hard coating application speed was set at 600 rpm for 8 seconds and spin off speed at 1200 rpm for 10 seconds. Hard Coating UV is cured by Fusion system H bulb at (5 feet per minute) 1.524 m/minute and followed by 30 seconds IR cure at 725F for 30 seconds, using Lesco IR curing unit. Coated mold was allowed to cool to room temperature and Impact Primer Coating n° 5 was applied at the same speed and timing as mentioned above. Impact Primer Coating was cured by UV light, using Fusion SYSTEM H bulb with belt speed of (5 feet per minute) 1.524 m/minute.

Final coating curing was achieved using Lesco IR curing unit set at 725F for 30 seconds.

The coated plastic mold was assembled, filed with optical substrate Composition n° 1 and polymerized within 20 minutes. Upon disassembly of the mold, all of the coatings transferred to the finished lens.

The performances of the finished lenses of examples 1 to 7 are given in Table below:

| Example No. | Dry adhesion test | Bayer abrasion test | Steel wool test | Transmission (%) | Impact energy (mJ) |
|---|---|---|---|---|---|
| 1 |  | Well | 4.47 | 1 | 98.8 | 692.40 |
|  |  |  |  |  | Tc = 1.68 mm |
| 2 |  | Well | 4.73 | 1 | 98.8 | 1126.60 |
|  |  |  |  |  | Tc = 2.56 mm |

| Example No. | Dry adhesion test | Bayer abrasion test | Steel wool test | Transmission (%) | Impact energy (mJ) |
|---|---|---|---|---|---|
| 3 | Well | 5.35 | 0 | 98.9 | 711.00<br>Tc = 1.38 mm |
| 4 | Well | 4.37 | 0 | 98.9 | 844.00<br>Tc = 1.46 mm |
| 5 | Well | 4.81 | 0 | 97.9 | 339.80<br>Tc = 1.48 mm |
| 6 | Well | 4.22 | 0 | 98.8 | 62.40<br>Tc = 1.37 mm |
| 7 | Well | 2.66 | 5 | 98.6 | 849.00<br>Tc = 1.34 mm |

Tc = Thickness at center

EXAMPLE 8

This example illustrates the use of a protective and releasing coating on the optical surfaces of the mold.

In this example, no hydrophobic top coat is used.

The composition of the releasing and protective coating was as follows:

| Component | Parts by weight |
|---|---|
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The polycarbonate molds are cleaned using soap and water and dried with compressed air. The mold surface are then coated with the above releasing and protecting coating composition via spin coating with application speed of 600 rpm for 3 seconds and dry speed of 1200 rpm for 6 seconds. The coating was cured using Fusion Systems H+bulb at a rate of (5 feet per minute) 1.524 m/minute. A reverse stack of vacuum deposited AR coats is then applied directly on the above coated molds (without any hydrophobic top coat on the above coated molds) according to the general procedure described previously. Once AR coating deposition was finished, the molds were coated first with a hard coating composition n° 1 and then with an impact primer coating composition n° 2, cured, and lenses were cast from optical substrate composition n° 1.

The stack AR coating/hard coating/primer released well from the surface of the coated mold.

EXAMPLE 9

Example 8 is reproduced except that the mold releasing and protective coating composition was as follows:

| Component | Parts by weight |
|---|---|
| PETA LQ (acrylic ester of pentaerythritol) | 4.00 |
| Dowanol PnP | 5.00 |
| Dowanol PM | 5.00 |
| n-propanol | 5.00 |
| 1360 (Silicone Hexa-acrylate, Radcure) | 2.00 |
| Surface active agent | 0.06 |
| Photoinitiator | 0.20 | and a hydrophobic top coat KP801 is used.

The whole stack top coat/AR coating/hard coat/primer released well from the coated polycarbonate mold and a lens having very good anti-abrasion, antireflective and impact properties was obtained.

EXAMPLE 10

Example 8 is reproduced except that the mold releasing and protective coating composition was as follows:

| Component | Parts by weight |
|---|---|
| PETA LQ (acrylic ester of pentaerythritol) | 5.00 |
| Dowanol PnP | 5.00 |
| Dowanol PM | 5.00 |
| n-propanol | 5.00 |
| Coat-O-Sil 3509 (reactive flow additive) | 0.10 |
| Photoinitiator | 0.20 | and a hydrophobic top coat KP801 is used.

The whole stack top coat/AR coating/hard coat/primer released well from the coated polycarbonate mold and a lens having very good anti-abrasion, antireflective and impact properties was obtained.

EXAMPLE 11

Example 8 is reproduced except that a hydrophobic top coat KP801 is used and that the molds are coated with the following release coating compositions according to the following protocole, before application of the subsequent coatings.

| Mold coating composition A: | |
|---|---|
| Deionized water at 60° C. | 0.95 |
| A-1100 (gamma aminopropyl trimethoxy silane) | 0.50 |

-continued

| Mold coating composition B: | |
|---|---|
| Deionized Water at 60° C. | 0.95 |
| Dow Q9-6346 (3-trimethoxysilyl propyl octadecyl dimethylammonium chloride) | 0.50 |

The polycarbonate molds were cleaned using soap and water and dried with compressed air. The molds surfaces were treated by dip coating in the mold coating composition A first for 60 seconds then rinsed off by 60° C. deionized water; then they were coated by dip with mold coating composition B and also rinse off with deionized water at 60° C. The coating composition B was cured using Blue M convection oven at 80° C. for 15 min.

The whole stack top coat/AR coating/hard coat/primer released well from the coated polycarbonate mold and a lens having very good anti-abrasion, antireflective and impact properties was obtained.

EXAMPLE 12

Example 8 is reproduced except that the molds were coated with a fluorocarbon polymer layer as a releasing coating.

Polycarbonate molds were prepared by cleaning ultrasonically in warmed aqueous detergents, then rinsed and dried according to known art. The polycarbonate molds were then heated to 100° C. for a period of time from 0.1–3 hours, to fully dry the material.

The molds were then loaded in the vacuum chamber with a base vacuum capability of better than 0.1 Pa. The chamber is pumped to a high vaccum level. After an ion bombardment of the mold surface, fluoropolymer Teflon was evaporated onto the mold surfaces using either resistance or electron beam heating, to a thickness of 2.5 to 150 nm.

Alternatively, the fluoropolymer layer was applied to the mold surfaces prior to vacuum deposition by means of spin- or dip-coating, using a dilute solution of soluble fluoropolymers such as Teflon AF, Teflon PTFE FEP, or Teflon PTFE PFA. The thickness of these coatings was 30 to 200 nm.

After deposition of the fluoropolymer layer, the oxide anti-reflecting multilayer stack was deposited (in reverse of the normal order), using the process described above.

2 lenses were made, one with a hydrophobic top coat KP801M, and the other one without KP801M.

When used, KP801M hydrophobic material was evaporated on the fluoropolymer layer using resistance heating. Then, the AR coating $SiO_2/ZrO_2/SiO_2/ZrO_2$ is deposited.

The layer vacuum deposited final was a thin $SiO_2$ layer after the stack is completed, to promote adhesion of the AR stack to the siloxane-based anti-scratch coating. This layer is not optically active, but is included only to enhance adhesion of the vacuum-deposited AR stack to the anti-scratch coating. Thereafter the other layers were deposited and the lenses cured according to the method described in example 8.

The whole stack AR coating/hard coat/primer or top coat/AR coating/hard coat/primer released well from the Teflon coated polycarbonate mold and a lens having very good anti-abrasion, anti-reflecting and impact properties was obtained.

EXAMPLE 13

Example 3 is reproduced, but using optical substrate composition n° 2 instead of optical substrate composition n° 1, which is then cured as follows:

The mold parts are taped in order to produce a cavity and filled using a syringe, with the optical substrate composition n° 2.

A pre-cure was made in 15 s using a iron doped mercury UV bulb supplied by IST, the intensity was 25–30 mW/cm² (measured 420 nanometer with OM 2 radiometer).

Curing was made in IST two side curing oven 2 minutes at 175 mW/cm².

Then curing was achieved in a thermal dynamic air oven, at a temperature of 80° C. for 8 minutes.

The assembly was edged with the plastic molds in order to generate a clear interface to help molds taking a part.

The complete stack was transferred to the lens.

EXAMPLE 14

Example 13 was reproduced, but using optical substrate composition n° 3.

The complete stack was transferred to the lens.

EXAMPLE 15

Example 14 was reproduced but using an allylic formulation using a monomer supplied by PPG under CR607 trade name, catalyzed with 3% by weight of IPP (diisopropylperoxide) and cured using a thermal cycle rising the temperature from 35° C. to 85° C. in 16 hours.

The stack was once against transferred to the lens.

EXAMPLE 16

Example 13 was reproduced but using an optical substrate composition which comprises 52 g of 1,2-bis (2-mercapto ethyl thio)-3-mercaptopropane with KSCN catalyst 190 ppm mixed with 48 g of xylylene diisocyanate.

A gel is obtained at room temperature in 5 minutes, curing is achieved at 120° C. during 2 hours in air oven.

The transfer is made and a very good adhesion is found.

The performances of the lenses of examples 13 to 15 are given in Table II below.

TABLE II

| Example No. | Bayer abrasion test | Steel wool test | Dry adhesion | Transmission (%) |
|---|---|---|---|---|
| 13 | 5.6 | 2 | Medium | 98.9 |
| 14 | 7.1 | 9 | Good | 97.7 |
| 15 | 6.2 | 0 | Good | 99.1 |

Bayer abrasion resistance was determined by measuring the percent haze of a coated and uncoated lens, before and after testing on an oscillating sand abrader as in ASTM F 735–81. The abrader was oscillated for 300 cycles with approximately 500 g of aluminum oxide ($Al_2O_3$) ZF 152412 supplied by Specially Ceramic Grains (former Norton Materials) New Bond Street; PO Box 15137 Worcester, Mass. 01615-00137. The haze was measured using a Pacific Scientific Hazemeter model XL-211. The ratio of the uncoated lens haze (final-initial) is a measure of the performance of the coating, with a higher ratio meaning a higher abrasion resistance.

Steel wool scratch resistance was determined as follows:

The lens was mounted coated surface up with double sided tape on the end of a one inch (2.54 cm) diameter pivoting rod. Steel wool (000 grade) was then pressed against the coated surface with a five pounds (2.267 kg) weight as back-pressure. The lens was then oscillated for 200 cycles against the steel wool (one inch (2.54 cm) travel), and the haze measured. The difference in haze (final-initial) as measured on a Pacific Scientific Hazemeter model XL-211 is reported as the wool scratch resistance value.

Coating adhesion was measured by cutting through the coating a series of 10 lines, spaced 1 mm apart, with a razor, followed by a second series of 10 lines, spaced 1 mm apart, at right angles to the first series, forming a crosshatch pattern. After blowing off the crosshatch pattern with an air stream to remove any dust formed during scribing, clear cellophane tape was then applied over the crosshatch pattern, pressed down firmly, and then rapidly pulled away from coating in a direction perpendicular to the coating surface. Application and removal of fresh tape was then repeated two additional times; The lens was then submitted to tinting to determine the percentage adhesion, with tinted areas signifying adhesion failures.

Coating passes adhesion tests when percentage adhesion is more than 95%.

EXAMPLES 17 AND 18

These examples illustrate the use of an organic antireflecting coating in the process of the invention.

A spin coated, thermal or UV curable antireflective coating (AR) is deposited on the surface of a thermal plastic mold. The mold assembly is comprised of a concave and convex mold to form a lens. Subsequently, on each AR mold surface, a scratch resistant coating was applied and finally the impact resistant primer coating was deposited. The scratch resistant coating can be formulated to be UV curable or thermal curable. The impact resistant primer coating can be an UV curable coating or a latex thermal curable coating.

The thermal curable AR coating layers can be catalyzed by a metal complex via IR curing and contains nanoparticle colloids. The UV curable AR coating layers can be acrylic or epoxy or a mixture of both, curable by free radical or cationic or a combination of both, and containing nanoparticle colloids.

The UV curable scratch resistant coating can be UV curable acrylic coating, cationic, and/or a combination of cationic and free radical reaction containing nanoparticle colloids. Thermal curable scratch resistant coating can be catalyzed by a metal complex via infra-red curing. This coating also contains nanoparticle colloids.

The UV curable impact coating consists of the free radical curing of an unsaturated hydrocarbon, cationic curing of an oxirane, and the combination of cationic with free radical chemistry. Thermal curable impact coating can be made of acrylic latex or urethane latex and cured by convection heat or an infra-red source.

A coupling agent is used to enhance the chemical bonding between the coating layers and the substrate system.

Following is the summary of the chemistry and process:

AR Coating Layers:

Low Index Layer

| Component | Parts |
| --- | --- |
| Glymo | 18.6 |
| 0.1 N HCl | 6.62 |
| Dimethyldiethoxysilane | 9.73 |
| Colloidal silica Nissan MA-ST | 60.1 |
| Aluminum acetyl acetonate | 2.40 |
| Isopropyl alcohol | 2.55 |

The coating is then diluted to 3.5% with Ethyl alcohol and surface active agent is added.

High index layer

| Component | Parts |
| --- | --- |
| Glymo | 4.01 |
| 0.1N HCl | 2.03 |
| Diacetone alcohol | 9.65 |
| Nissan HIT32M | 32.17 |
| Aluminum acetyl acetonate | 0.54 |
| Ethyl alcohol | 54.47 |

A surface active agent is then added.

Nissan HIT 32M is a colloïd composite sol of $TiO_2/SnO_2$.

Impact primer coating: (UV curable acrylic).

| Component | Parts |
| --- | --- |
| Diethylene glycol diacrylate (SR-344) | 12.42 |
| Aliphatic urethane triacrylate (EB-265) | 16.87 |
| n-Propanol | 20.27 |
| Dowanol PM | 20.27 |
| Dowanol PnP | 20.27 |
| Coupler | 9.00 |
| ITX | 0.063 |

EXAMPLE 17

Hard Coating n°1, Impact Primer Coating n°1b

The low index layer was deposited onto the mold surface by spin coating at application speed of 900 rpm and spin off at 2500 rpms for 10 seconds. The coating was cured by Casso Lesco IR curing set at 385° C. (725° F.) for 1 minute. The high index layer was deposited onto the cooled mold under the same conditions as the low index layer. The thermal plastic mold was coated with Hard Coating n°1, again, after cooling. Hard coating application speed was set at 400 rpm for 8 seconds and spin off speed at 800 rpm for 10 seconds. Hard coating cured by IR for 30 seconds with (725F) setting, using Lesco IR curing unit. The coated mold was allowed to cool to room temperature and Impact primer coating n°6 was applied at the same speed and timing as mentioned above. Impact primer coating was cured by UV light, using Fusion system H bulb belt speed of 1,524 m/minute (5 feet per minute).

Final coating cure was achieved using Lesco IR curing unit set at 725 F for 30 seconds.

The coated Thermal plastic mold was assembled, filled with UV curable acrylic lens material (Optical substrate composition n°1) and polymerized within 20 minutes. Upon disassembly of the plastic mold, all of the coatings were transferred to the finished lens.

Following is the performance result:

| Bayer abrasion test | Steel wool test | Dry adhesion | Impact (mJ) | Center thickness | % T (hazegard) |
|---|---|---|---|---|---|
| 1.93 | 1.49 | Good | 559.7 | 1.36 mm | 95.0 |

Avg. % Transmission of an uncoated lens of the same substrate is 91.4%.

EXAMPLE 18

Thermal Curable, Urethane Latex W-234

Molds were coated with low and high index spin AR layers as in Example n°17. The thermal plastic mold was coated with Hard coating n°2. Hard coating application speed was 500 rpm for 8 seconds and spin off at 1200 rpm for 10 seconds. Hard coating precured in a thermal heated oven for 10 minutes at 80° C. The coated mold was allowed to cool to room temperature. Impact primer coating n°2 was applied at the application speed 400 rpm for 8 seconds and spin off 1000 rpm for 10 seconds. Impact primer coating, precured at the same temperature and timing as the Hard coating.

Final coating curing was done in a thermal heated oven for 2 hours at 90° C.

The coated plastic mold was assembled, filled with UV curable acrylic (Optical substrate composition n°1) lens material and polymerized within 20 minutes. Upon disassembly of the molds, all of the coatings transferred to the finished lens.

Following is the performance result:

| Bayer abrasion test | Steel wool test | Dry adhesion | Impact (mJ) | Center thickness | % T (hazegard) |
|---|---|---|---|---|---|
| 1.94 | 1.74 | Good | 441 average | 1.18 mm | 94.9 |

Light Transmission Test

Transmission was measured using a BYK GARDNER Haze-guard plus hazemeter catalog n°4725.

Impact Resistance Test

Impact energy was measured using a proprietary system. It can be measured by using the protocole of FDA drop ball test with increasing weights for the ball up to the breaking of the lens or the appearance of a visual crack, generally having the shape of a star, where the ball impacted. The corresponding energy is then measured.

What is claimed is:

1. A method for forming a coated optical article comprising the steps of:
    (a) providing a two-part mold having opposed optical surfaces defining therebetween a molding cavity;
    (b) forming successively, on at least one of the optical surfaces of the mold an anti-reflecting coating, a scratch-resistant coating and an impact-resistant primer coating;
    (c) filling the molding cavity with an optical substrate, liquid, curable composition;
    (d) curing the liquid curable composition, and
    (e) disassembling the two-part mold for recovering a coated optical article comprising an optical substrate having deposited and adhered on at least one of its faces, an impact-resistant primer coating, a scratch-resistant coating and an anti-reflecting coating.

2. The method of claim 1, wherein the two-part mold is made of a plastic material.

3. The method of claim 2, wherein the two-part mold is made of a plastic material selected from the group consisting of polycarbonates, polyamides, polyimides, polysulfones, copolymers of polyethylene terephtalate and polycarbonate, crystal polyethylene terephtalate, glass fiber reinforced polyethylene terephtalate and polynorbornenes.

4. The method of claim 2, wherein the plastic material is polycarbonate.

5. The method of claim 2, wherein the plastic material further comprises a release agent.

6. The method of claim 5, wherein the release agent is selected from the group consisting of trimethylchlorosilane. chloromethyltrimethylsilane, chloropropyltrimethylsilane, chloromethyl dodecyldimethylsilane, chlorine terminated polydimethylsiloxane, (3,3-dimethylbutyl) dimethylchlorosilane, hexamethyldisilazane, octamethylcyclotetrasilozane, aminopropyldimethyl terminated polydimethylsiloxane, 3-trimethoxysilyl propyl octadecyl dimethylammonium chloride, tetradecyldimethyl (3-trimethoxysilyipropyl) ammonium chloride, trimethylethoxysilane and octadecyltrimethoxysilane.

7. The method of claim 2, further comprising, prior to step (b), a step of forming a protective and/or release coating on the optical surface of the mold.

8. The method of claim 7, wherein the protective and/or release coating is selected from:
    UV cured acrylic layer;
    an amine containing polysiloxane layer;
    a fluorocarbon polymer layer;
    a vacuum deposited magnesium fluoride layer.

9. The method of claim 1, wherein the anti-reflecting coating comprises a stack of dielectric material layers of alternate high and low refractive indices.

10. The method of claim 9, wherein the stack of dielectric material layers is a four layer $SiO_2/ZrO_2/SiO_2/ZrO_2$ stack.

11. The method of claim 9, further comprising the step of forming an additional $SiO_2$ layer onto the anti-reflecting coating for promoting adhesion to the scratch-resistant coating.

12. The method of claim 10, further comprising the step of forming an additional $SiO_2$ layer onto the anti-reflecting coating for promoting adhesion to the scratch-resistant coating.

13. The method of claim 1, wherein the scratch-resistant coating is formed by curing a composition comprising as main constituents an epoxyalkoxysilane, a dialkyldialkoxysilane and colloidal silica or a hydrolyzate thereof.

14. The method of claim 13, wherein the scratch-resistant coating composition further comprises an effective amount of a coupling agent which is a pre-condensed solution of an epoxyalkoxysilane and an unsaturated alkoxysilane.

15. The method of claim 14, wherein the epoxyalkoxysilane is selected from the group of γ-glycidoxypropyltrimethoxy silane, γ-glycidoxypropylpentamethyldisiloxane, γ-glydicoxypropylmethyldi-isopropenoxysilane, (γ-glycidoxypropyl)methyldiethoxysilane, γ-glycidpropyldimethylethoxysilane, γ-glycidoxypropyldiisopropylethoxysilane and (γ-glycidoxypropyl)bis(trimethylsiloxy)methylsilane.

16. The method of claim 14, wherein the unsaturated alkoxysilane is selected for the group consisting of tris (2-methoxyethoxy)silane, vinyl tris-isobutoxysilane, vinyl tri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxy-silane, vinylbis(trimethylsiloxy)silane, vinyldimethoxyethoxysilane, alkyltriethoxysilane, alkyltriethoxysilane and allyltris(trimethylsiloxy)silane, 3-acryloxypropyltris(trimethysiloxy)silane, 3-acryloxypropyltriethoxysilane, acryloxypropylmethyldimethoxysilane, 3-acryloxypropylethylbis(trimethyl-siloxy)silane, 3-acryloxypropyldimethylethoxysilane, n-(3-acryloxy-2-hydroxypropyl)-3-aminopropyl-triethoxysilane, 3-methacryloxypropylltris(vinyldimethyxyl-siloxy)silane, 3-methacryloxypropyltris(trimetholsiloxy)-silane, 3-methacryloxypropyl tris(methoxyethoxy)silane, 3-methacrypropyltri-methoxysilane, 3-methacryloxypropylpentamethyldi-siloxane, 3-methacryloxypropylmethyl-dimethoxysilane, 3-methacrylpropylmethyl-diethoxysilane, 3-methacryloxypropyldimethylmethoxysilane, 3-methacryloxypropyldimethylethoxysilane, 3-methacrylpropenyltrimethoxy-silane and 3-methacryloxypropylbis(trimethyl-siloxy)methylsilane.

17. The method of claim 1, wherein the impact-resistant primer coating is formed by curing a poly(meth)acrylic based composition or a polyurethane based composition.

18. The method of claim 17, wherein the compositions are latexes.

19. The method of claim 17, wherein the impact-resistant primer coating composition comprises an effective amount of a coupling agent which is a pre-condensed solution of an epoxyalkoxysilane and an unsaturated alkoxy silane.

20. The method of claim 19, wherein the epoxyalkoxysilane is selected from the group of γ-glycidoxypropyltrimethoxysilane, γ-glycidoxypropylpentamethyldisiloxane, γ-glydicoxypropylmethyldiiso propenoxysilane, (γ-glycidoxypropyl)methyldiethoxysilane, γ-glycidoxy propyldimethylethoxysilane, γ-glycidoxypropyldiisopropylethoxy silane and (γ-glycidoxypropyl)bis(trimethylsiloxy) methylsilane.

21. The method of claim 19, wherein the unsaturated alkoxysilane is selected for the group consisting of tris (2-methoxyethoxy)silane, vinyltrisisobutoxysilane, vinyltri-t-butoxysilane, vinyltriphenoxysilane, vinyltrimethoxysilane, vinyltriiIsopropoxysilane, vinyltriethoxysilane, vinyltriacetoxysilane, vinylmethyldiethoxysilane, vinylmethyldiacetoxy-silane, vinylbis (trimethylsiloxy)silane, vinyldimethoxyethoxysilane, allyltriethoxysilane, alkyltriethoxysilane and allyltris(trimethylsiloxy)silane, 3-acryloxypropyltris(trimethysiloxy)silane, 3-acryloxypropyltriethoxysilane, acrylpropylmethyldimethoxysilane, 3-acryloxypropylethylbis(trimethyl siloxy)silane, 3-acryloxypropyldimethylethoxysilane, n-(3-acryloxy-2-hydroxypropyl)-3-aminopropyltriethoxysilane, 3-methacryloxyltris(vinyldimethylsiloxy)silane, 3-methacryloxypropyltris (trimethylsiloxy)silane, 3-methacryloxypropyl tris(methoxyethoxy)silane, 3-methacryloxypropyltrimethoxysilane, 3-methacryloxypropylpentamethyl disiloxane, 3-methacryloxypropyl-methyldimethoxysilane, 3-methacryloxypropylmethyldiethoxysilane, 3-methacryloxypropyldimethylmethoxysilane, 3-methacryloxypropyldimethyl-ethoxysilane, 3-methacryloxypropenyltrimethoxysilane and 3-methacryloxypropylbis (trimethylsiloxy)methylsilane.

22. The method of claim 1, wherein the optical substrate is a substrate resulting from the polymerization of:
    diethyleneglycol bis (allylcarbonate) based compositions,
    (meth)acrylic monomer based compositions;
    thio(meth)acrylic monomer based compositions;
    polythiourethane precursor monomer based compositions; or
    epoxy and/or episulfide monomer based compositions.

* * * * *

UNITED STATES PATENT AND TRADEMARK OFFICE
CERTIFICATE OF CORRECTION

PATENT NO. : 6,890,458 B2
DATED : May 10, 2005
INVENTOR(S) : Weber et al.

It is certified that error appears in the above-identified patent and that said Letters Patent is hereby corrected as shown below:

Title page,
Item [73], Assignee, please delete "General" and insert -- Generale --.

Column 24,
Line 15, please delete "trimethylchlorosilane." and insert -- trimethylchlorosilane, --.
Line 24, please delete "(3-trimethoxysilyipropyl)" and insert -- (3-trimethoxysilylpropyl) --.
Line 33, after "layer;" please insert -- and --.
Line 60, please delete "-glydicoxypropylmethyldi-isopropenoxysilane" and insert -- -glydicoxypropylmethyldiisopropenoxysilane --.

Signed and Sealed this

Eleventh Day of October, 2005

JON W. DUDAS
*Director of the United States Patent and Trademark Office*